June 13, 1967 J. R. CASSANO ETAL 3,324,791
XEROGRAPHIC ROLLER FUSER DRIVE APPARATUS
Filed Dec. 31, 1964 7 Sheets-Sheet 1

INVENTORS.
JAMES R. CASSANO
LYMAN H. TURNER
BY
ATTORNEYS

June 13, 1967  J. R. CASSANO ETAL  3,324,791
XEROGRAPHIC ROLLER FUSER DRIVE APPARATUS
Filed Dec. 31, 1964  7 Sheets-Sheet 2

INVENTORS.
JAMES R. CASSANO
LYMAN H. TURNER
BY

ATTORNEYS

INVENTORS.
JAMES R. CASSANO
LYMAN H. TURNER

ATTORNEYS

INVENTORS.
JAMES R. CASSANO
LYMAN H. TURNER

ATTORNEYS

June 13, 1967  J. R. CASSANO ETAL  3,324,791
XEROGRAPHIC ROLLER FUSER DRIVE APPARATUS
Filed Dec. 31, 1964  7 Sheets-Sheet 2

INVENTORS.
JAMES R. CASSANO
BY LYMAN H TURNER

ATTORNEYS

June 13, 1967 J. R. CASSANO ET AL 3,324,791
XEROGRAPHIC ROLLER FUSER DRIVE APPARATUS
Filed Dec. 31, 1964 7 Sheets-Sheet 6

INVENTORS.
JAMES R. CASSANO
BY LYMAN H. TURNER

ATTORNEYS

INVENTORS.
JAMES R. CASSANO
LYMAN H. TURNER
BY
ATTORNEYS 3,324,791
XEROGRAPHIC ROLLER FUSER DRIVE APPARATUS
James R. Cassano, Rochester, and Lyman H. Turner, Pittsford, N.Y., assignors to Xerox Corporation, Rochester, N.Y., a corporation of New York
Filed Dec. 31, 1964, Ser. No. 422,727
1 Claim. (Cl. 100—172)

This invention relates to improvements in heat fusing devices and, particularly, to an improved apparatus for fixing xerographic powder images.

More specifically, the invention relates to an improved heated-roll fusing device. Although the invention is considered to have general application, it is particularly useful in the field of xerography and has an important application in the fusing of resinous powder images produced by electrophotography or xerography onto sheets of paper and the like to which the powder images have been transferred after they have been formed by deposition of powder on an electrostatic latent image. Therefore, for convenience of illustration, the invention is described with reference to its use as a heat fuser for xerographic powder images. However, it is to be understood that it may be employed with equal facility in other fields.

In the process of xerography, for example, as disclosed in Carlson Patent 2,297,691, issued Oct. 6, 1942, a xerographic plate, comprising a layer of photoconductive insulating material on a conductive backing, is given a uniform electric charge over its surface and is then exposed to the subject matter to be reproduced, usually by conventional projection techniques. This exposure discharges the plate areas in accordance with the radiation intensity that reaches them, and thereby creates an electrostatic latent image on or in the photoconductive layer. Development of the latent image is effected with an electrostatically charged, finely divided developing material or toner which is brought into surface contact with the photoconductive layer and is held thereon electrostatically in a pattern corresponding to the electrostatic latent image. Thereafter, the developed xerographic powder image is usually transferred to a support surface such as paper to which it may be fixed by any suitable means.

One of the methods in common use for developing the electrostatic latent image is described in Walkup Patent 2,618,551 and is known as cascade development, and is in general use for line copy development. In this technique, the powder or toner is mixed with a granular "carrier" material, and this two-component "developer" is poured or cascaded over the plate surface. The function of the carrier material is to improve the flow characteristics of the powder and to produce, on the powder, by triboelectrification, the proper electrical charge so that the powder will be attracted to the image. More exactly, the function of the carrier material is to provide the mechanical control to the powder, or to carry the powder to an image surface and, simultaneously, to provide homogeneity of charge polarity.

In the Carlson patent it is noted that a variety of types of finely divided electroscopic powders may be employed for developing electrostatic latent images. However, as the science of xerography has progressed, it has been found preferable to develop line copy images with a powder or toner formed of any of a variety of pigmented thermoplastic resins that have been specifically developed for the purpose. A number of such developing materials are manufactured and marketed commercially and are specifically compounded for producing dense images of high resolution and to have characteristics to permit convenient storage and handling. Such developing materials are compounded to permit them to be fixed to the surface of a transfer material either by heat fixing or vapor fixing techniques, in accordance with the particular application in which they are employed, that is, the individual particles of resin (toner) soften and coalesce when heated or plasticized by solvent, so that they become sticky or tackified and readily adhere to the surface of the support material.

The term "tackified" and the several variant forms thereof used throughout this specification are employed to define the condition of the powder particles of the xerographic powder image when heated or plasticized by a solvent in a manner such that the individual particles soften and coalesce and in which state they become sticky and readily adhere to other surfaces. Although this condition necessarily requires a flowing together of the particles to effect a thorough fusion thereof, it is to be understood that the extent of such flowing is not sufficient to extend beyond the boundary of the pattern in which the particles are formed.

One of the important applications of the process of xerography comprises its use in automatic copying machines for general office use wherein the powder images formed on a xerographic plate are transferred to paper and then fixed thereon by heat fusing. In order to fuse resinous powder images formed of the powdered resins now commonly used, it is necessary to heat the powder and the paper to which it is to be fused to a relatively high temperature, such as approximately 325° F. It is undesirable, however, to raise the temperature of the paper substantially higher than 375° F. because of the tendency of paper to discolor at such elevated temperatures.

It has long been recognized that one of the fastest and most positive methods of applying heat for fusing the powder image to paper is to bring the powder image into direct contact with a hot surface, such as a heated flat plate.

But, as the powder image is tackified by heat, part of the image carried by the support material will stick to the surface of the heated plate, so that as the next sheet is placed on the heated plate, the tackified image partially removed from the first sheet will partly transfer to the next sheet and, at the same time, part of the tackified image from said next sheet would adhere to the heated plate. This process is commonly referred to in the printing art as "set off" or "offset," the latter term being preferred.

The offset of toner onto the heated contacting surface has heretofore led to the rejection of contact fusers in favor of other heat fixing devices, primarily coiled radiant element heaters with reflectors. These radiant element heaters with reflectors have the disadvantage of dissipating a large quantity of heat into the machine enclosure in which they are used, heat transfer to the powder image is inefficient, and they present a safety hazard because of the exposed radiant element.

It is, therefore, the principal object of this invention to improve the construction of a direct contact fusing device for toner images which will rapidly fuse toner images without causing the toner particles to smear while in a tackified state of to offset onto the device.

This and other objects of the invention are attained by means of a direct contact fusing device in which the toner image is fused by forwarding the sheet or web of paper bearing the toner image between two rolls, one of which is heated, both rolls being provided with a thin coating of and adhesive material, such as a coating of Teflon, a DuPont Corporation product composed of tetrafluoroethylene resin. The heated roll is provided with a silicone oil film to prevent toner offset.

For a better understanding of the invention, as well as other objects and further features thereof, reference is had to the following detailed description of the invention to be read in connection with the accompanying drawings, wherein:

FIG. 9 is a diagrammatic illustration of the upper and lower fuser rollers when pressure is applied thereto.

Figure 1:
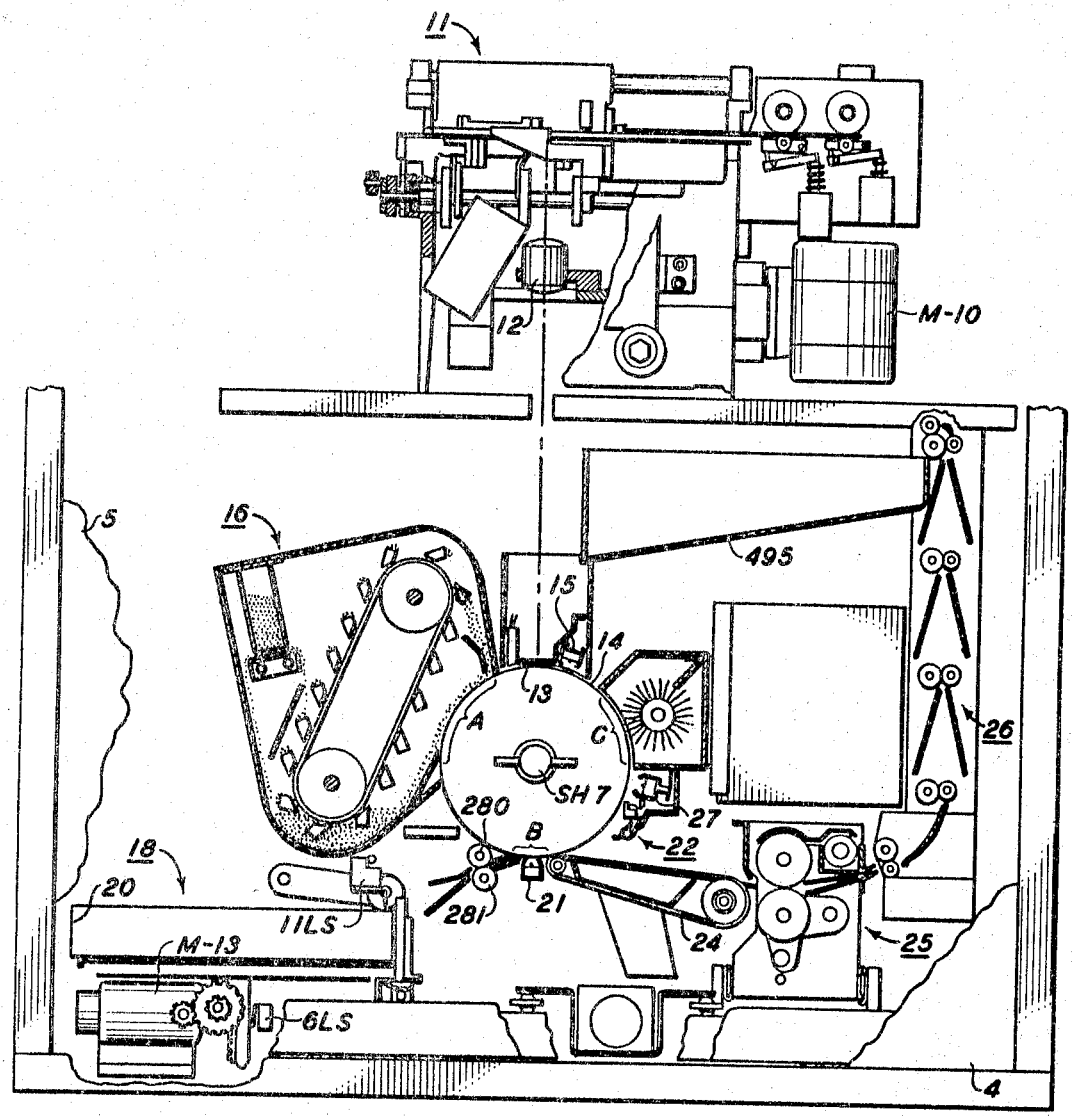
FIG. 1 illustrates schematically the preferred embodiment of a xerographic reproducing apparatus adapted for automatic operation, and incorporating a roller heat fuser constructed in accordance with the invention.
Figure 2:
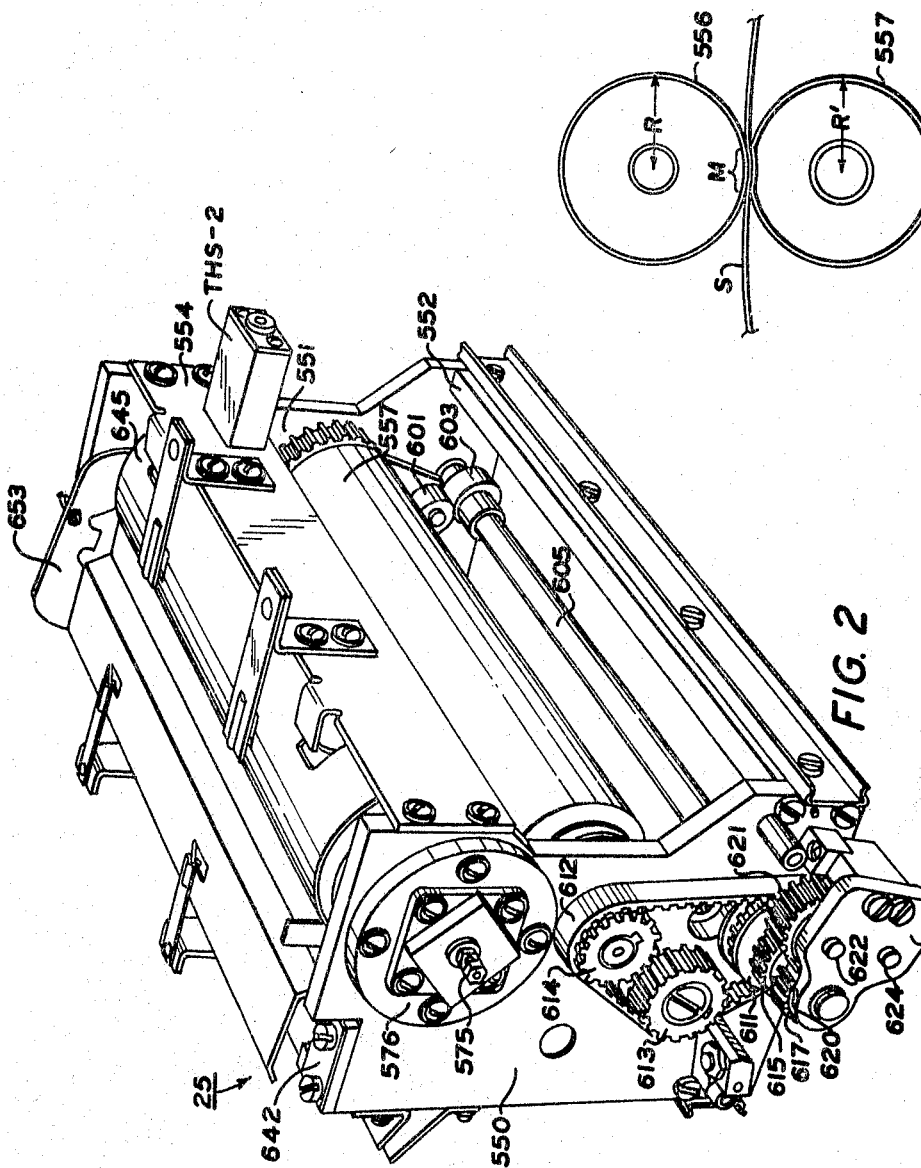
FIG. 2 is an isometric view of the heat fuser assembly and drive therefor.

Although it forms no part of the subject invention, there is shown schematically in FIG. 1 a continuous xerographic apparatus for the purpose of illustrating a suitable environment for the heat fuser of the subject invention.

As shown schematically in FIG. 1, the automatic xerographic reproducing apparatus comprises a xerographic plate 14 including a photoconductive layer or light-receiving surface on a conductive backing and formed in the shape of a drum, which is mounted on a shaft journaled in frame to rotate in the counter-clockwise direction to cause the drum surface sequentially to pass a plurality of xerographic processing stations.

For the purpose of the present disclosure, the several xerographic processing stations in the path of movement of the drum surface may be described functionally as follows:

A charging station, at which a uniform electrostatic charge is deposited on the photoconductive layer of the xerographic drum;

An exposure station, at which a light or radiation pattern of copy to be reproduced is projected onto the drum surface to dissipate the drum charge in the exposed areas thereof and thereby form a latent electrostatic image of the copy to be reproduced;

A developing station, at which a xerographic developing material including toner particles having an electrostatic charge opposite to that of the electrostatic latent image are cascaded over the drum surface, whereby the toner particles adhere to the electrostatic latent image to form a xerographic powdered image in the configuration of the copy being reproduced;

A transfer station, at which the xerographic powder image is electrostatically transferred from the drum surface to a transfer material or support surface; and A drum cleaning and discharge station, at which the drum surface is brushed to remove residual toner particles remaining thereon after image transfer, and at which the drum surface is exposed to a relatively bright light source to effect substantially complete discharge of any residual electrostatic charge remaining thereon.

As shown, the charging arrangement includes a corona charging device 15 which includes a corona discharge array of one or more corona discharge electrodes that extend transversely across the drum surface and are energized from a high potential source and are substantially closed within a shielding member.

Next subsequent thereto in the path of motion of the xerographic drum is an exposure station. An optical scanning or projection system is provided to project a flowing image onto the surface of the photoconductive drum from a moving original.

The optical scanning or projection assembly may comprise a minified data card projection system 11 which is adapted to scan individual data cards with a light line and project the image rays onto the moving light-receiving surface of the xerographic drum. The scanning light may be provided by a suitable light source arranged to scan a minified data card. The data card image rays are directed through a lens 12 onto the xerographic drum through a slot in a fixed light shield 13 positioned adjacent to the xerographic drum surface.

Adjacent to the exposure station is a developing station A in which there is positioned a developer apparatus 11 including a casing or housing having a lower or sump portion for accumulating developer material. A bucket type coveyor is used to carry the developing material to the upper part of the developer housing where it is cascaded over a hopper chute onto the xerographic drum to effect development.

Positioned next and adjacent to the developing station is the image transfer station B which includes a sheet feeding arrangement adapted to feed sheets of support material, such as paper or the like, successively to the xerographic drum in coordination with the presentation of the developed image on the drum surface at the transfer station.

The sheet feeding mechanism includes a sheet feed device 18 adapted to feed the top sheet, of a stack of sheets on a tray 20, to feed rollers 280, 281 which arrests and aligns each individual sheet of material and then in timed relation to the movement of the xerographic drum, advances the sheet material into contact with the xerographic drum in registration with a previously formed xerographic powder image on the drum.

The transfer of the xerographic powder image from the drum surface to the sheets of support material is effected by means of a corona transfer device 21 that is located at or immediately after the line of contact between the support material and the rotating drum. In operation, the electrostatic field created by the corona transfer device is effective to tack the support material electrostatically to the drum surface, whereby the support material moves synchronously with the drum while in contact therewith. Simultaneously with the tacking action, the electrostatic field is effective to attract the toner particles comprising the xerographic powder image from the drum surface and cause them to adhere electrostatically to the surface of the support material.

Immediately subsequent to the image transfer station, there is positioned a stripping apparatus to paper pick-off mechanism 22 for removing the sheets of support material from the drum surface. This device may be of the type disclosed in Rutkus et al. United States Patent 3,062,536 for stripping the leading edge of the sheet from the drum surface and to direct it onto an endless conveyor 24 whereby the sheet material is carried to a fixing device 25, the subject matter of this invention. At the fixing device, the transferred xerographic powder image on the sheet of support material is permanently fixed or fused thereto as by heat. After fusing, the reproduction is discharged from the apparatus at a suitable point for collection externally of the apparatus by means of the conveyor 26. In the embodiment shown, the reproductions are discharged from conveyor 26 into a receiving tray 495.

The next and final station in the device is a drum cleaning station C, having positioned therein a corona preclean device 27 to remove any powder remaining on the xerographic drum after transfer.

It is believed that the foregoing description is sufficient for the purposes of this application to show the general operation of a xerographic reproducing apparatus using a roller fusing device constructed in accordance with the invention. For further details concerning the specific construction of the xerographic apparatus and the data card handling apparatus 11, reference is made to copending application Sek No. 422,804 filed concurrently herewith on Dec. 31, 1964, in the name of Hewes et al.

Referring now to the drawings, there is shown a preferred embodiment of a heated roller fusing apparatus 25 constructed in accordance with the invention.

As shown in FIGS. 2–9, the fuser apparatus 25 is of the heated roller type and includes a frame for supporting the upper roller of the fuser apparatus formed by spaced apart end plates 550, 551 held in spaced relation by two lower braces 552, 553 and two upper braces 554, 555. The four braces, more or less are secured to the four corners of each of the end plates thereby forming a generally rectangular frame for the fuser structure. The lower fuser roller is supported in a position parallel to the upper roller by this frame.

Direct contact fusing of a powder image on a sheet of paper support material is achieved by forwarding a sheet of the support material bearing the powder image to be fused between a heated upper roller, generally designated 556, and an unheated lower roller, generally designated 557, rotating in intimate contact under pressure during a fusing operation. The support material carrying the unfused toner images, is advanced between these two rollers with the toner images facing the heated roller so that fusing occurs when contact is made.

Figure 4:
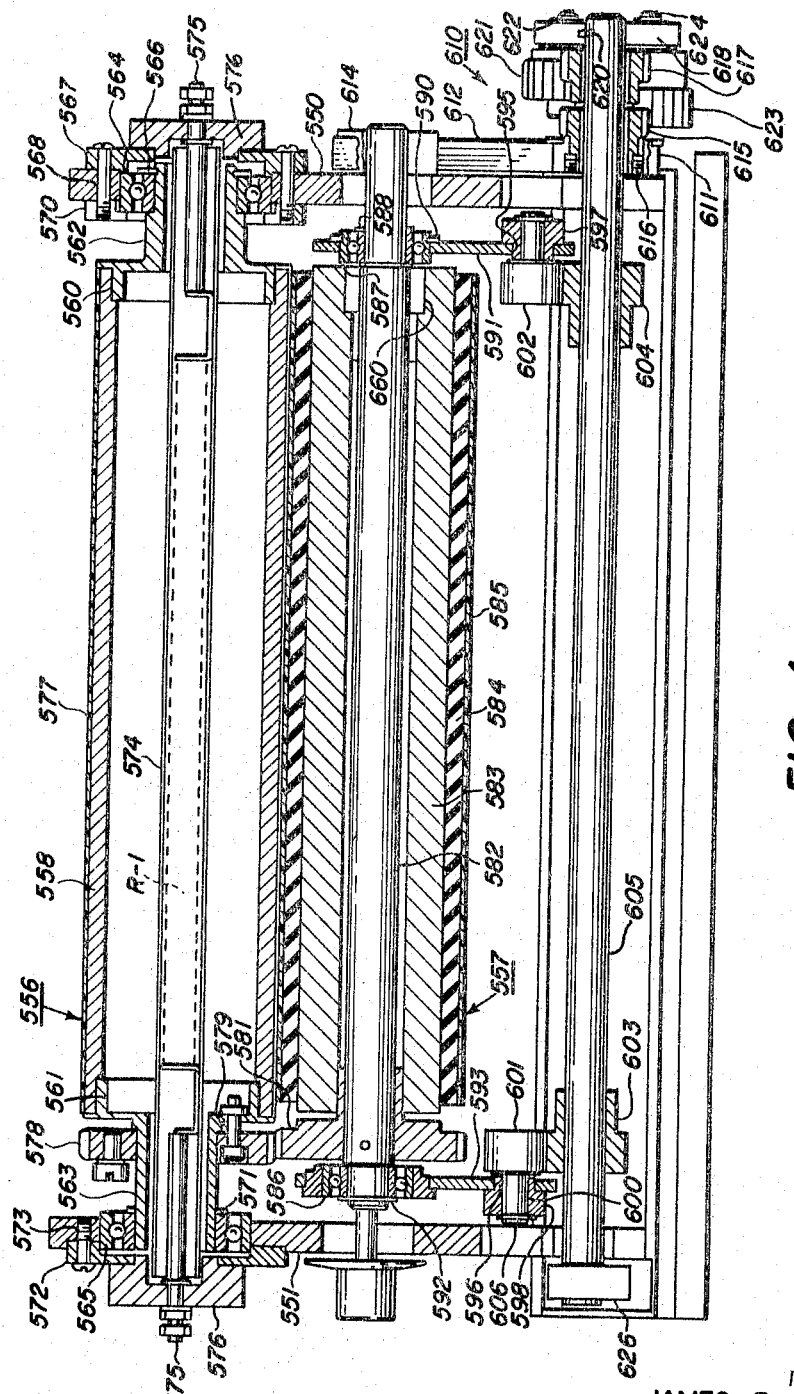
FIG. 4 is a side sectional view of the fuser assembly with parts broken away to show the structure of the fuser rollers.
Figure 6:
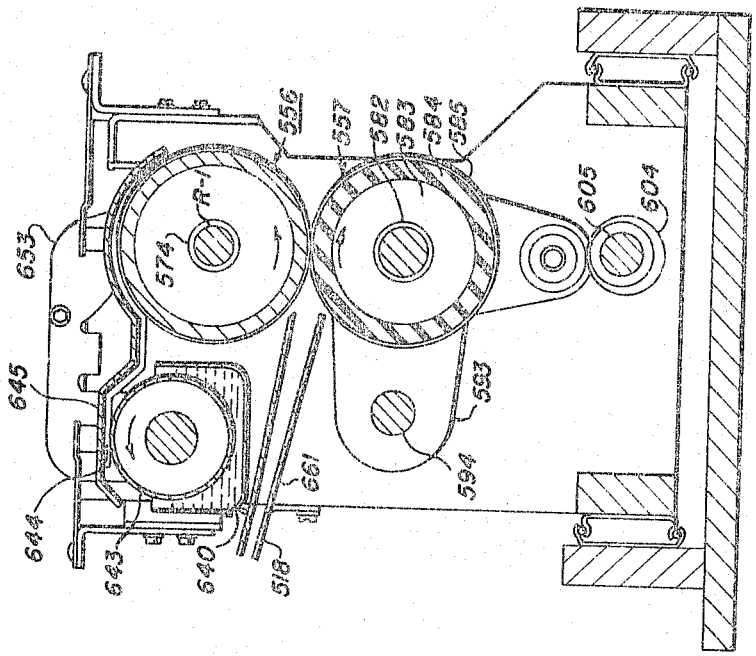
FIG. 6 is a sectional view of the fuser assembly taken along line 6—6 of FIG. 3, with parts broken away to show details of the upper fuser roll and applicator roll.
Figure 5:
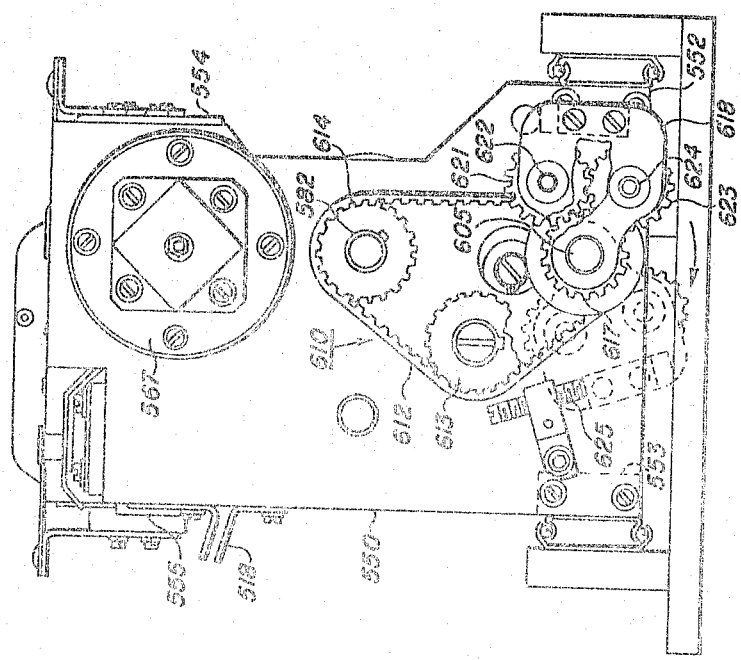
FIG. 5 is a rear view of the fuser assembly.

As shown in FIG. 4, the upper roller 556 includes a cylinder 558 partly closed at opposite ends by right-hand and left-hand fuser roller caps 560 and 561, respectively, which are secured to the cylinder, as by a press fit. The caps 560, 561, are formed with tubular shanks 562, 563, respectively, which extend outwardly from the cylinder 558. The roller is journaled for rotation by bearings 564 and 565 which encircle the shanks 562, 563 and are positioned in the frame plates 550 and 551, respectively.

The inner race of the bearing 564 is secured between a shoulder on the shank 562 and a thrust washer 566 held against this race by a retaining ring 567. The outer race is secured to the plate 550 by means of the ring 567 and an inner ring 570 which are held to the plate 550 by screws 568. The grooved races closely encompassing portions of the bearing balls maintain the axial relationship between the races and thus locate the roller 556 relative to the fuser assembly frame.

On the opposite end of the roller, the inner race of the bearing 565 is locked against inward movement by a thrust washer 571 secured in a suitable groove formed inwardly on the shank 563. The inner and outer races of the bearing 565 are free to move slightly during expansion of the roller 556 when heated but are prevented from removal from the frame plate 551 by a retaining ring 572 secured by screws 573 to the outer surface of frame plate.

Each of the fuser roller caps is provided with a suitable aperture to receive a quartz tube 574 which supports a resistance heating element R–1. The ends of the resistance element R–1 project through the shanks 562, 563 and terminate in terminals 575 which may be connected by suitable conductors to a source of power. Insulating caps 576, secured to the plates 550, 551 by the rings 567, 572, respectively, are provided between the terminals and the frame plates to prevent dust or dirt from entering the bearings 564, 565 and to prevent inadvertent electrical arcing. The caps 576 are formed with cavities for accommodating and supporting the ends of the quartz tube 574, which is stationary while the roller 556 rotates. A thermistor THS–2 part of a suitable electrical control system for controlling power to the resistance element R–1, is suitably positioned in thermal relation to the fuser roller 556. Details concerning the electrical control circuit for the fuser are not necessary for the present invention. Any suitable circuit may be utilized to attain this end, such for example, the circuit described in the above referred to patent application of Hewes et al.

To prevent toner offset onto the heated roller contacting the unfused toner image on the support material, an offset preventing material 577 covers the outer surface of cylinder 558 of the roller 556. A suitable material may be a coating of a product of tetrafluoroethylene resin sold under the trademark of Teflon by the Du Pont Corporation.

The upper roller 556 is driven in direct relation by the lower roller 557 by means of gears, one secured to each of these rollers. Between the bearing 565 and the left hand cap 561 for the upper roller, a gear 578 is secured by suitable screws 579 to the cap, and this gear is operatively engaged with a gear 581 secured to the support shaft 582 for the lower roller 557.

The lower roller 557 includes a rigid core 583 covered with a suitable resiliently deformable material 584, such as silicone rubber, which, in turn, is covered by a Teflon coating 585. The Teflon coating deforms with the rubber 583 in relation to the amount of pressure between heated roller 556 and the roller 557 to form an arc of contact for proper fusing of the thermoplastic resin on the support material. The coating provides a protective covering on the material 584 to prevent deterioration of the rubber due to heat and/or contact with offset preventing liquid, the application of which is to be hereinafter discussed.

The roller 557 is rotatably supported on the support shaft 582 by left-hand and right-hand bearings 586 and 587, respectively. The inner race of right-hand bearing 587 is held against outward axial movement relative to the shaft 582 by a ring 588 while the outer race is held against movement by a retaining ring 590 secured in a suitable groove provided in the outer race and secured by suitable screws to an upright plate 591. The inner race of left-hand bearing 586 is held against outward movement relative to the shaft by a retaining ring 592 secured in a groove provided in the shaft, and its outer race is held by an upright plate 593 but is allowed to move axially due to expansion of metal parts when heated. The gear 581 for rotating the roller 557 is secured to the left-hand side of the shaft 582 by a suitable set screw (not shown) to enable the roll to be driven in a manner to be described.

Figure 8:
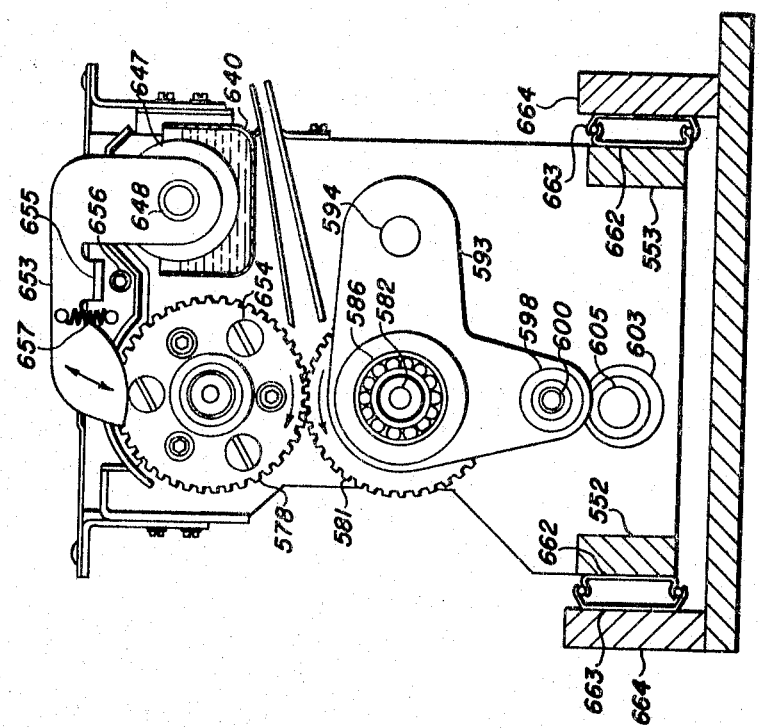
FIG. 8 is a sectional view taken along the line 8—8 of FIG. 3.

The upright plates 591, 593, as shown in FIG. 8, are triangular in shape with one apex being formed with an aperture for accommodating bearings 586, 587 and through which the shaft 582 extends. Another aperture is formed on each of these plates at a second apex arranged horizontally relative to the shaft 582 and through these apertures a shaft 594 projects. The shaft 594 is mounted in the frame plates 550, 551 for support thereat and permits limited rotative movement of the plates 591, 593 about its axis.

The plates 591, 593 which support the shaft 582 for the lower roller 557 are formed at their lower apexes with apertures through which extend bushings 597, 598 secured therein and which rotatably support pins 600, only one of which is shown in FIG. 4. At the inner ends of the pins 600, but on the other side of the plates 591, 593, are secured circular rollers 601, 602 which cooperate with cam rollers 603, 604, respectively, mounted on a cam shaft 605 which is rotatably mounted on the frame for the fuser assembly. The cam rollers 603, 604 are arranged eccentrically relative to the axis of the cam shaft 605 and when rotated by this shaft force the coacting follower rollers 601, 602, respectively, upwardly slightly to rotate each of the plates 591, 593 about the axis of the support shaft 594 for these plates. This action serves to raise the lower roller 557 into a cooperating position with the heated roller 556 once for each partial revolution of the shaft 605 for fusing toner particles onto a sheet of copy paper as it travels between the rollers 556, 557 or to lower the lower roller out of contact with the heater roller when there is no sheet therebetween. The rollers 601, 602 are described as circular; however, these may be arranged eccentrically relative to their respective pins 600 for the purpose of presetting the maximum spacing between the rollers 556, 557. A screw 606 may be provided in each of the pins 600 to effect this adjustment.

The roller 557 is raised into pressure contact with the heater roller 556 by operation of a differential drive mechanism generally indicated by the reference numeral 610 which serves to drive the lower roller and consequently, the heater roller. To this end, the mechanism 610 is provided with a timing gear 611 rotatably mounted at one end of the shaft 605. A timing belt 612 is arranged around the gear 611, an idler gear 613 and, a driven gear 614 secured to the extreme end of the lower roller shaft 582. Also rotatably mounted on the shaft 605 in axial alignment with the gear 611 is a drive gear 615 which is secured to the timing gear 611 by a set screw 616. With this arrangement it will be apparent that rotation of the drive gear 615 about the shaft 605 will impart rotation of the lower roller 557.

Another gear 617 is also rotatably mounted on the shaft 605 and is located toward the extreme end thereof in relation to the drive gear 615. The extreme end of the shaft terminates in an aperture formed in a support plate 618 and is fixed thereto by a set screw 620. A first planetary gear 621 is supported for rotation inwardly and upwardly of the support plate 618 and a pivot pin 622 and is in mesh with the gear 617. A second planetary gear 623 is supported for rotation inwardly and downwardly of the support plate by a pivot pin 624 and is in mesh with the gear 621 immediately above it and with the drive gear 615.

In the arrangement of the differential mechanism 610, thus far described, the drive gear 615 and the gear 617 serve as the sun gears for the planetary gears 621 and 623. Means are provided for rotating the gear 617, as will be described hereinafter, in order to initiate action and coaction in the fuser assembly. In utilizing the differential characteristics of the gear assembly, it is required that the total of the frictional forces developed between the rollers 556 and 557 and their respective bearing supports, the inertia these elements produce together with the inertia and friction encountered with the timing belt 612 and the timing gears 611, 613 and 614 is greater than the total frictional forces produced by the rotation of the gears 621, 623 upon their respective pivots combined with the friction developed by the rotation of the gear 617 upon the shaft 605 and the interaction between all the gear teeth involved. With this condition, rotating the gear 617 by an external device will cause rotation of the gear 621 to mesh therewith which will cause rotation of the gear 623. This latter gear being in mesh with the drive gear 615 will cause the plate 618 and the two gears 621, 623 to orbit about relatively fixed sun gears 615 and 617 since the force necessary to produce this orbiting action is less than the force required to rotate the gear 615, as pointed out above. This orbiting motion about the axis of the shaft 605 will start from the position shown in FIG. 5 and will result in movement of the plate 618 and gears 621, 623 in the direction of the arrow until the edge of the plate 618 is stopped by a screw stop 625.

This movement of the plate 618, in turn, produces corresponding rotation of the shaft 605 which, for the arrangement shown, may rotate for approximately 100°. With the stop 625 being in the form of an adjusting screw, the amount of rotation can be varied. As the shaft 605 rotates, it rotates the eccentric surfaces 603, 604 which action forces the cam followers 601, 602 upwardly for raising the lower roller 557 into contact with the heater roller 556. The degree of force can be varied by the positioning of the adjusting screw stop 625 which limits the amount of camming provided by the cams 603, 604.

Figure 7:
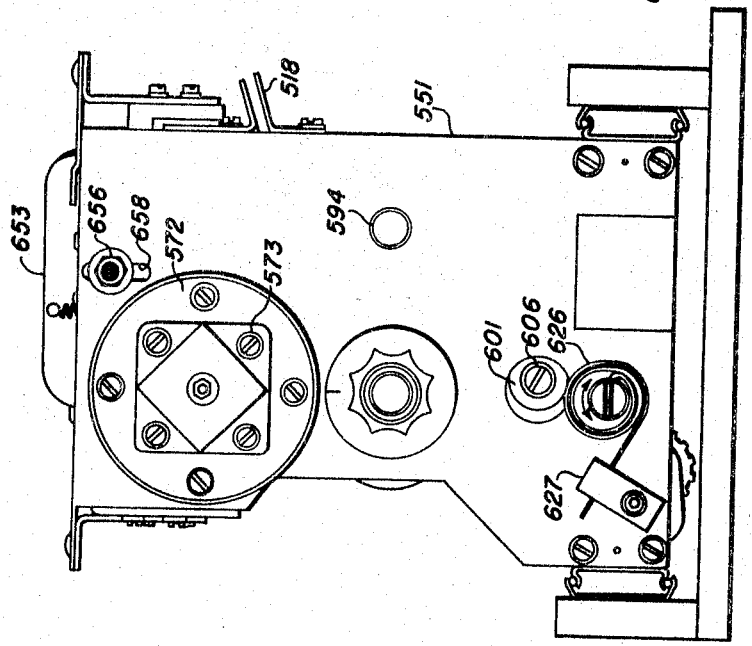
FIG. 7 is a front view of the fuser assembly.

With the rollers 556, 557 forced into contact and with the plate 618 now held against further rotation, continued rotation of the gear 617 will impart rotation to the drive gear 615 through the planetary gears 621, 623. Rotation of the gear 615 will impart the same motion to the timing driven gear 611 for driving the lower roller 557 which drive will produce rotation of the roller 556 by means of the gears 578, 581. After the external drive means is no longer effective to rotate and hold the gear 617, the shaft 605 is rotated in the opposite direction to bring the parts of the differential mechanism into their positions, as shown in FIG. 7 by a helical spring 626 secured at one end to the other end of the shaft 605 and at its other end to an anchor 627 mounted on the frame plate. During rotation of the shaft 605 for imparting upward movement of the lower roller 557, the spring 626 will wind up slightly to produce spring tension on the shaft which tension is released to rotate the shaft in an opposite direction to bring the parts of the differential mechanism to their original positions.

Figure 10:
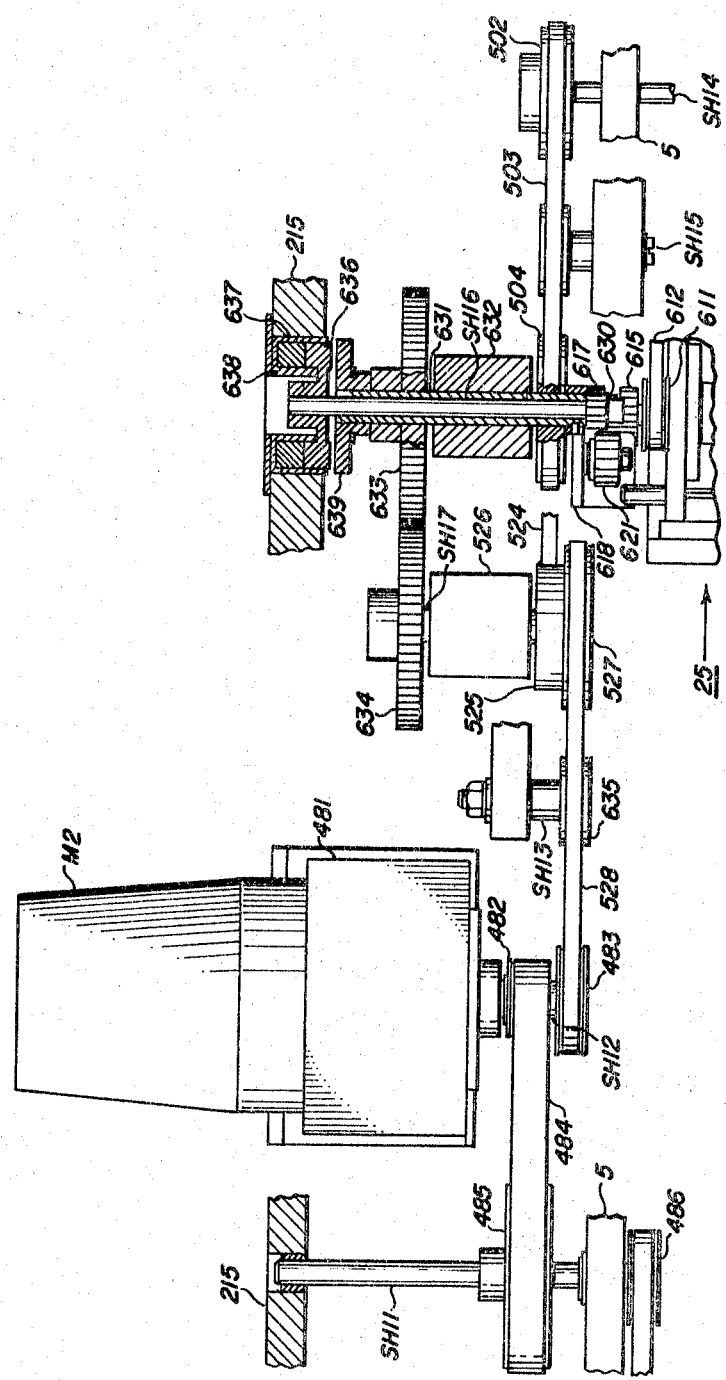
FIG. 10 is a schematic view of a drive system for use with the fuser assembly.

The external drive means for imparting the rotative force to the gear 617 is derived from a drive mechanism illustrated in FIG. 10. Immediately above the gear 617 and in mesh therewith is a drive gear 630 secured to the drive shaft SH16 and encircled by a drive sleeve 631. The shaft and sleeve are mounted on a post 632 which is part of the main machine frame and which may extend upwardly from the base thereof. As will be described hereinafter, the fuser assembly 25 is movable as a unit into and out of the machine frame and, when moved into its operating position, will permit the meshing engagement of the gear 630 with the gear 617.

On the end of the sleeve 631, remote from the drive gear 630, there is secured a large gear 633 which is in operative engagement with another large gear 634 attached to one end of the shaft SH17. This shaft is mounted for rotation on an upwardly extending post 526 secured to the machine base and has secured thereto at its other end the pulley 527. A drive belt 528 is arranged around the pulley 527 a main drive pulley 483 and an idler 635 rotatably mounted on a shaft SH13 which is suitably mounted on the machine frame. The main drive motor M2 which may be utilized to drive the drum 14 serves to impart continuous rotation to the large gear 633 and thereby maintain continuous rotation of the drive sleeve 631. As shown in FIG. 10, the sleeve 631 is open adjacent the gear 617 and may be suitably supported at this end by a bearing (not shown).

The end of the shaft SH16, remote from the gear 630, has secured thereto a magnetic clutch member 636 in the form of a disc which is rotatably mounted with an annular groove 637 formed in the rear frame plate for the machine. Within the groove 637 and lining the walls thereof is an annular channel member 638 in which the clutch member rotates. Preferably, the clutch member and the channel member are made of highly magnetizable material in order to produce strong magnetic lines when energized with D.C. potential. Suitable conductors may be provided for connecting the channel to a source of D.C. potential, such as a rectifier, and be arranged so that the clutch member 636 will be energized whenever the main drive motor M2 is energized.

A second clutch member 639 in the form of a disc, serving as an armature, is secured to one end of the drive sleeve 631 in close face-to-face relationship to the clutch member 636. When energized by D.C. potential, the clutch member 636 will produce magnetic lines of force and be attracted to the clutch member 639. Normally, the member 636 and the shaft SH16 are stationary while the disc 639 continuously rotates. With magnetic lines of force existing between the members 636 and 639, the member 636 will rotate in unison with the member 639 for establishing movement of the lower roller 557 into forced engagement with the upper roller 556 and rotation of these rollers for fusing images on sheets of copy material.

In actual practice, during operation of the xerographic machine when the main motor is continuously in operation, the clutch member 639 continuously drives the clutch member 636 resulting in the continuous rotation of the rollers 556, 557. When the machine is not in running condition or is in "standby" condition, the circuit to the clutch mechanism is open and the fuser assembly is not operating. In addition, during "standby" condition, when the fuser is not operating, the rollers 556 and 557 are automatically separated. This separation, when the rollers are not rotating prevents thermal set of the rubber in these rollers.

A supply of silicone oil to be applied to roller 557 is maintained in an oil pan 640 having fastened to opposite ends thereof bracket means 642 by which the oil pan is mounted on the frame plates. An applicator roll 643 is used to convey a thin film of oil as the applicator roll is rotated in the silicone oil, to wick 644, such as a felt pad secured as by staples (not shown), to a wick support plate 645 in a manner whereby the pad rests on the peripheral surface of the roller 556 and the applicator roll 643. The wiper plate is curved at one end to conform to the peripheral surface of the roller 557.

Figure 3:
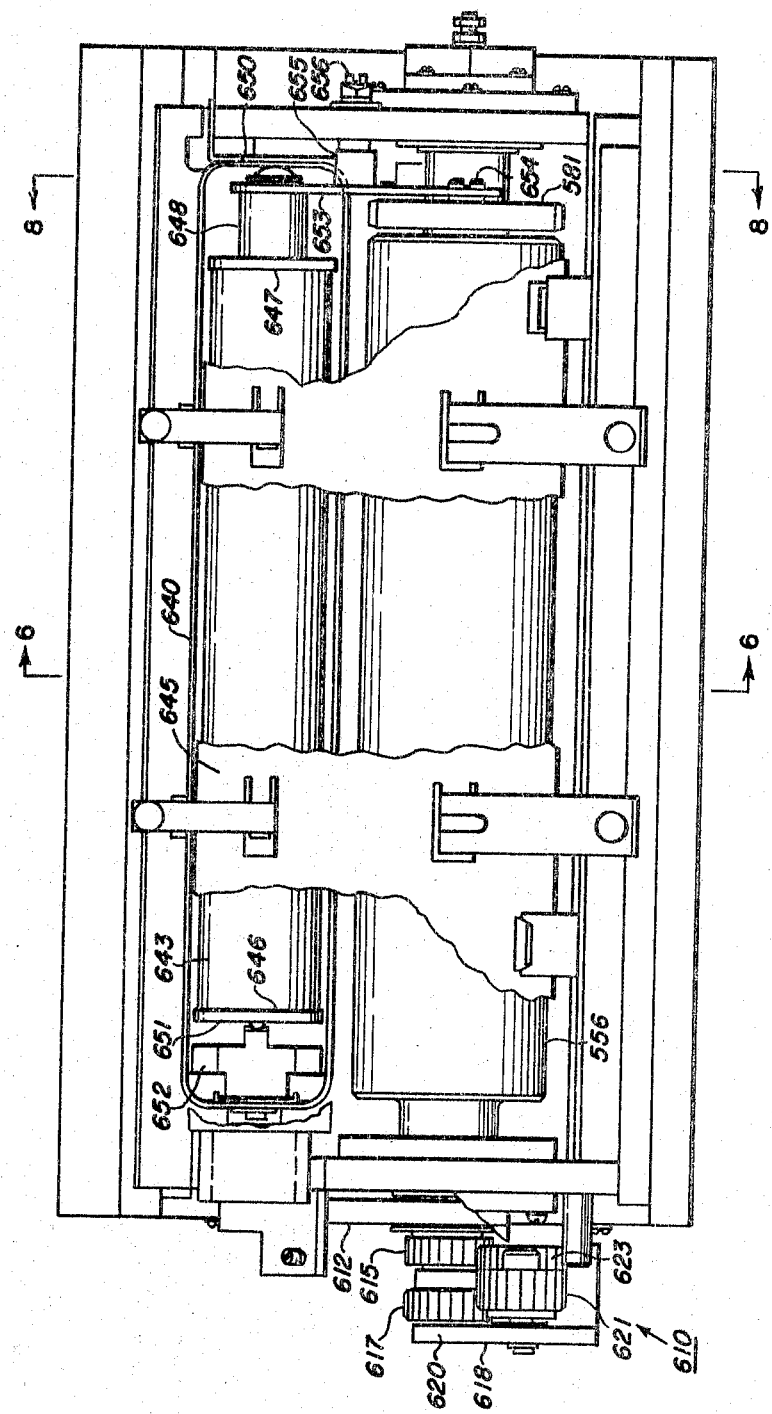
FIG. 3 is a top view of the fuser assembly with parts broken away to show details of the fuser rollers and supports.

The applicator roll 643 consists of a hollow cylindrical oil drum supported at opposite ends by caps 646 and 647. At one end, the oil drum is secured by the cap 647 on a hollow shaft 648, which is journaled for rotation in a bracket 650 supported in the fuser assembly and is supported at the other end by a bearing 651 mounted for rotation in a bracket 652. A compression spring, not shown, is axially supported within the shaft 648 between bracket 650 and the cap 647 to facilitate replacement of applicator roll 643, the spring normally biasing the applicator roll to the left as shown in FIG. 3.

To effect rotation of the applicator roller in one direction, the roller is driven by a one-way clutch, (not shown) enclosed within the hollow shaft 648. A control arm 653 is secured to the shaft 648 for intermittently rotating the roller 643 a few degrees for every rotation of the heated roller 556. The control arm 653, driving the one-way clutch mechanism within the shaft 648, is provided with a depending cam surface portion adapted to be engaged when each of a plurality of an actuator studs 654 extending outward from the gear 578 for the upper roller 556 is rotated into contact therewith. A tab 655 formed on the control arm 653 is biased into contact with an adjustable screw 656 fastened to frame plate 551 of the fuser assembly, by a spring 657 secured to the control arm 653.

The amount of intermittent rotation of the applicator roller may be regulated by adjustment of the positioning of the screw 656 in a slot 658 which controls the arc of travel of the control arm governing the one-way clutch mechanism within the shaft 648. With this arrangement, as the upper heated roller 556 is rotated by means of the drive mechanism previously described, the actuator studs 654 will successively strike the cam surface portion of the control arm to cause the control arm to oscillate about the axis of applicator roller during rotation of the upper roller 556. In this manner, the applicator roll is indexed, a portion of a revolution during each oscillating cycle of the control arm 653 through the one-way clutch drive between the applicator roller and the control arm.

During operation of the fuser assembly, the rollers 556 and 557 must maintain identical velocity at their point of contact at all times when a powdered image is being fused on a sheet of copy paper. This is necessary to prevent tearing the copy sheet or distorting the image on the support material. As shown in FIG. 9, the outer diameters of the rollers, when not in contact are equal and since both of the rollers are driven by gears having equal diameters, the lineal speed is the same when these rollers are merely in touch contact or out of contact. However, when pressure is applied to the lower roller 557 forcing it into contact with the heated roller 556, the distance between the centers of these rollers decreases. The radius R from the center of roller 556 to its point of contact with roll 557 remains fairly constant owing to the metallic cylinder 558 for which the roller is provided to facilitate the radiation of heat from the heater element R-1 to the covering 577. The radius R' of the roller 557, from its center to point of contact with roll 556, is decreased due to the pressure upon the resilient material 584 to provide an arc M of contact to assure proper fusing.

If the angular velocities of the rollers are the same, this difference in radii would result in a differential lineal velocity at the point of contact with the periphery of the upper roller 556 traveling faster than the periphery of the lower roller with the resultant smearing of the tackified image and the possible tearing of the copy sheets.

In order to prevent any differential in lineal velocity at the point of contact of the rollers, an overriding clutch 660 is provided on the shaft 582 for the lower roller 557. The driven portion of this clutch is fixed to the core 583, and the driving portion is secured to the shaft 582 which is driven at a constant speed by the differential mechanism 610. By the use of overriding clutch or one way clutch 660 to drive the roller 557, the roller is free wheeling in one direction relative to the driving shaft 582 for the roller; that is, the one-way clutch allows the lower roller to run at a greater speed than its driving member, the shaft 582. This increase in speed is caused by the upper roller 556 which, when there is a sheet of papers between the rollers, produces sufficient friction between the rollers to drive the lower surface while these rollers are in contact. During this phase of operation, the shaft 582 continues to drive the gears 581 and 578 at its original constant velocity and the heater roller 556 maintains constant velocity. With the slight compression of the coating 585 and the resilient material 584 in the lower roller existing at this time, the lower roller will experience a slight increase in speed in order to maintain the constant lineal speed at the point of contact for the rollers. This action will cause a slight overriding of the lower roller upon its shaft 582 made possible by the one-way clutch mechanism provided between the driving shaft and the driven lower roller.

As a sheet of copy paper is advanced between the rollers 556, 557, the powder image on the copy sheet will contact the peripheral heated surface of the roller 556 whereby the powder image becomes tackified. The application of the silicone oil from the oil pan 640 upon the Teflon coating 577 will prevent the offset of the toner material onto the heated contact surface of the heated roller.

After the powder image has been fused upon the sheet of copy paper, the sheet is transported by action of the rollers 556, 557 out of the fuser assembly, through the guide plates 518 and into engagement with the feed rollers 520 of the vertical transport system 26 to be conveyed out of the machine as previously described.

The fuser assembly 25 is also provided with means for permitting easy and complete removal of the assembly as a unit from the machine. To this end, each of the lower braces 552, 553 has secured thereto the inner race 662 of a commercial type file cabinet drawer slides. Each of the outer races 663 for the slides are attached to a support member 664 which extend across the entire length of the fuser assembly and are secured in parallel arrangement to the base of the machine. Suitable ball-bearings mounted between the races 662, 663 permit slidable action between the fuser assembly and the machine and removal of the assembly therefrom. Means (not shown) may be provided for locking the assembly in its operating position wherein the driven gear 617 on the assembly is in mesh with the driving gear 630.

While the invention has been described with reference to the structure disclosed herein, it is not confined to the details set forth, and this application is intended to cover such modifications or changes as may come within the purposes of the improvements or the scope of the following claim.

What is claimed is:

A drive mechanism for contact fusing resin material carried on a support material, such as sheets of paper, said mechanism including:

a casing, a first roller mounted on a shaft journalled in said casing, a second roller having a shaft journaled for rotation and movement from a first position wherein said second roller is out of contact with said first roller and to a second position wherein said second roller is in cooperating pressure contact with said first roller, actuator means connected to said second roller for moving said roller from said first position wherein said roller is out of operative relation with said first roller to said second position wherein said second roller is in cooperative relation to said first roller, drive means having a drive gear, a differential gear set having first and second sun gears, planet gears connected therebetween and a frame for rotatably supporting the gears, said first sun gear engageable with said drive gear and, during operation of said drive means, being adapted initially to produce revolution of the planet gears and the frame and to produce rotation of the second sun gear when the frame is held against revolving action, a drive train operatively connecting the shaft of the second roller to said second sun gear, said frame being connected to the actuator means and adapted to actuate the same for moving the second roller to the second position when the frame revolves about said first sun gear, and means for limiting the revolution of said frame during operation of said drive means whereby the frame is held against further revolving action to permit rotation of the second roller while in said second position.

References Cited

UNITED STATES PATENTS

| | | | |
|---|---|---|---|
| 1,817,604 | 8/1931 | Behan | 68—258 |
| 1,820,032 | 8/1931 | Roberts | 68—253 |
| 2,214,095 | 9/1940 | Watts | 68—253 |
| 2,268,829 | 1/1942 | Kauffman | 68—258 |
| 2,766,604 | 10/1956 | Thiele | 68—253 |

LOUIS O. MAASSEL, *Primary Examiner.*